(12) United States Patent
Duan et al.

(10) Patent No.: US 6,334,651 B1
(45) Date of Patent: Jan. 1, 2002

(54) LUMBAR SUPPORT ADJUSTING MECHANISM

(75) Inventors: May Duan; Jintao Liu, both of Windsor; Jake Friesen, Leamington, all of (CA)

(73) Assignee: Schukra Geratebau GmbH, Leonding (AT)

(*) Notice: Subject to any disclaimer, the term of this patent is extended or adjusted under 35 U.S.C. 154(b) by 0 days.

(21) Appl. No.: 09/540,104

(22) Filed: Mar. 31, 2000

Related U.S. Application Data

(60) Provisional application No. 60/178,925, filed on Feb. 1, 2000.

(51) Int. Cl.$^7$ .............................................. A47C 3/025
(52) U.S. Cl. .................................. 297/284.4; 297/284.1
(58) Field of Search .................... 297/284.1, 284.4, 297/287.4, 284.8, 284.2; 74/500.6, 501.6

(56) References Cited

U.S. PATENT DOCUMENTS

| | | |
|---|---|---|
| 2,247,713 A | 7/1941 | Peterson et al. |
| 2,617,508 A | 11/1952 | Kanehl |
| 2,734,413 A | 2/1956 | Dunkelberger |
| 2,827,991 A | 3/1958 | Bradway |
| 2,989,160 A | 6/1961 | Woodruff |
| 3,104,744 A | 9/1963 | Wade |
| 3,305,057 A | 2/1967 | McAlpin et al. |
| 3,406,797 A | 10/1968 | Toussaint |
| 3,662,867 A | 5/1972 | Kinzbach ..................... 192/45 |
| 4,094,489 A | 6/1978 | Yoshimura ................. 248/429 |
| 4,159,847 A | 7/1979 | Arai ............................ 297/284 |
| 4,316,631 A | 2/1982 | Lenz et al. ................. 297/284 |
| 4,465,317 A | 8/1984 | Schwarz ..................... 297/284 |
| 4,995,490 A | 2/1991 | Kanai .......................... 192/45 |
| 5,013,087 A | 5/1991 | Nagasaka .................... 297/284 |
| 5,042,628 A | 8/1991 | Malecha ....................... 192/45 |
| 5,087,098 A | 2/1992 | Ishizuka ................. 297/284 C |
| 5,197,780 A | * 3/1993 | Coughlin |
| 5,215,350 A | 6/1993 | Kato ......................... 297/284.4 |
| 5,302,002 A | 4/1994 | Nagasaka ................. 297/284.4 |
| 5,370,445 A | 12/1994 | Golynsky ..................... 297/326 |
| 5,375,912 A | 12/1994 | Stulik et al. ................. 297/304 |
| 5,378,039 A | 1/1995 | Lie ............................. 297/301 |
| 5,388,889 A | 2/1995 | Golynsky .................... 297/302 |
| 5,417,474 A | 5/1995 | Golynsky .................... 297/302 |
| 5,427,434 A | 6/1995 | Hybarger .................... 297/302 |
| 5,482,150 A | 1/1996 | Stark ............................ 192/45 |
| 5,511,852 A | 4/1996 | Kusiak et al. ............ 297/301.4 |
| 5,522,488 A | 6/1996 | Schwarzbich ................... 192/8 |
| 5,567,010 A | 10/1996 | Sparks ..................... 297/284.4 |
| 5,593,210 A | 1/1997 | Schwarzbich ............. 297/361.1 |
| 5,641,205 A | 6/1997 | Schmidt ................... 297/284.7 |
| 5,769,491 A | 6/1998 | Schwarzbich ............ 297/284.4 |
| 5,771,751 A | 6/1998 | Schwarzbich ............... 74/502.6 |
| 5,794,479 A | 8/1998 | Schwarzbich ................ 74/143 |
| 6,003,941 A | * 12/1999 | Schuster, Sr. et al. |
| 6,139,102 A | * 10/2000 | Von Moller |

FOREIGN PATENT DOCUMENTS

| | | |
|---|---|---|
| DE | 0774590 B1 | 10/1999 |

\* cited by examiner

*Primary Examiner*—Milton Nelson, Jr.
(74) *Attorney, Agent, or Firm*—Howard & Howard

(57) ABSTRACT

An actuator for a manually operated lumbar support system provides for an in-out directional adjustment of a flexible member via control of tension in a cable through rotary motion of a lever or knob attached to a driving shaft associated with a directional one-way locking clutch that slips in either direction under manual actuation and locks when no manual actuation occurs or movement stops. A housing and an eccentric hub combine to form a wedge space. Several locking members, such as rollers or balls, are used to lock the rotation in response to tension from the cable, but only one locking member exists in each wedge space. The designed locking direction may be either clockwise or counterclockwise, as desired. The drive shaft has fingers associated with each locking member to move the locking members to release the clutch in the opposite direction. The tension of the cable may be used to lock the actuator in one direction.

17 Claims, 9 Drawing Sheets

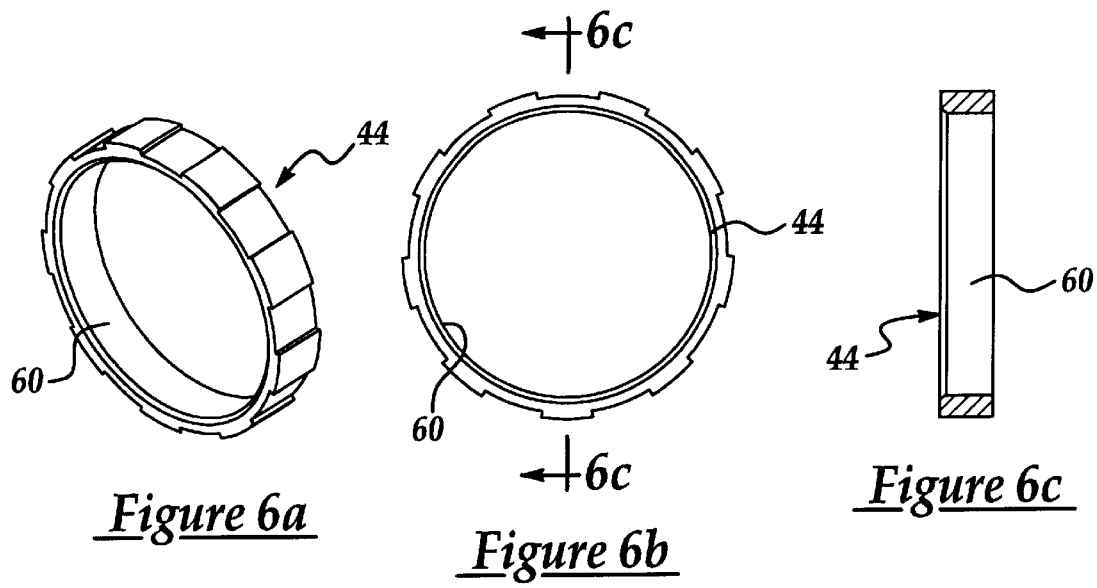
*Figure 6a*  *Figure 6b*  *Figure 6c*
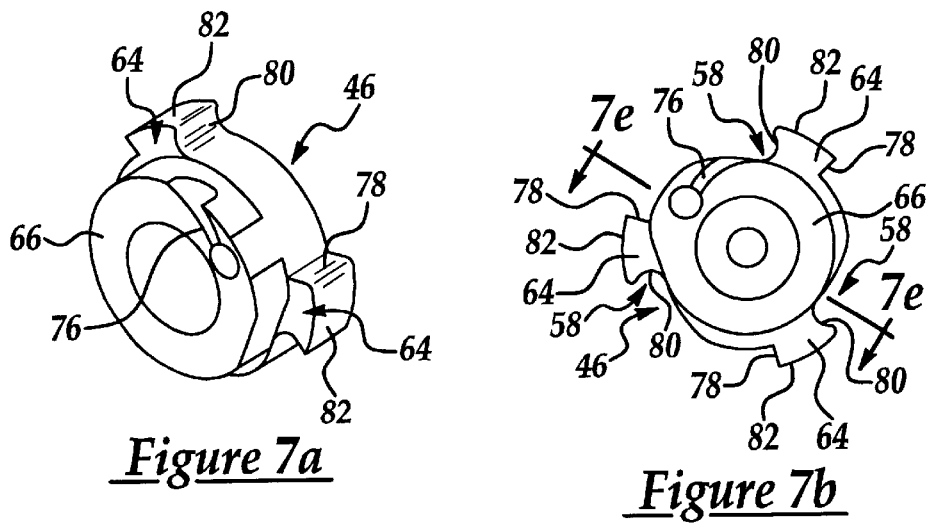
*Figure 7a*  *Figure 7b*
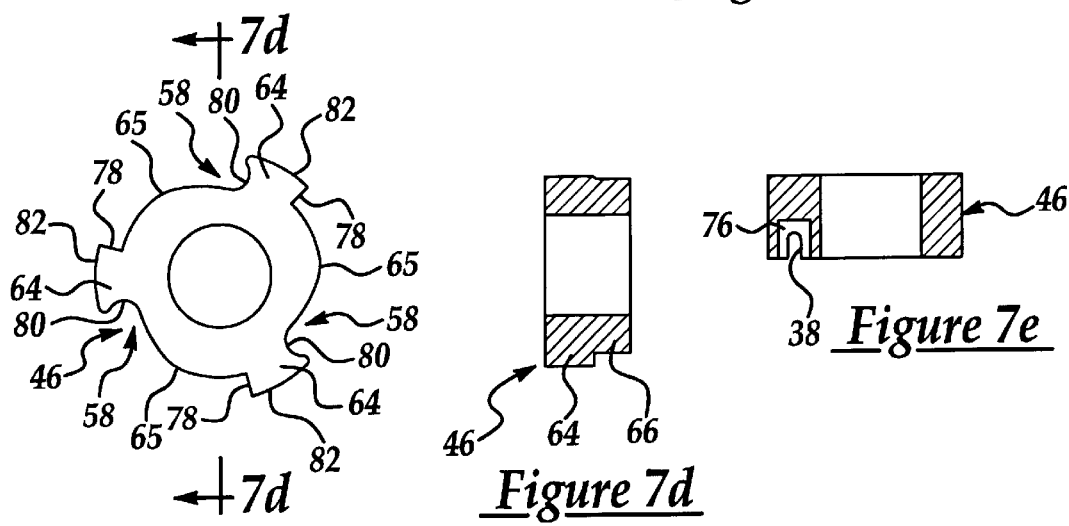
*Figure 7c*  *Figure 7d*  *Figure 7e*

LUMBAR SUPPORT ADJUSTING MECHANISM

This appl. claims benefit of Prov. No. 60/178,925 filed Feb. 1, 2000.

BACKGROUND OF THE INVENTION

This application is directed to actuation of lumbar support mechanisms, particularly for seats.

1. Technical Field

The present invention generally relates to a lumbar support system. More particularly, the present invention relates to an actuator for a lumbar support system that provides for in-out directional adjustments by using an actuator connected via a cable to control a flexible mechanical mechanism.

2. Discussion

A conventional mechanical lumbar support system uses an actuator for each mode, adjustment or plane of operation. Thus, a two-way lumbar support system would provide an arching directional adjustment of a flexible, resilient support element in an in-out direction and require a single actuator.

Accordingly, the need exists to provide an improved, cost-effective, lightweight and efficient actuator for a lumbar support system. The current invention creates such an actuator for a lumbar support system and offers major improvements over previous systems such as actuation that can lock in one predetermined rotary direction, less free play, and simplification of parts to make the actuator easier to produce than prior art actuators. A further object of a durable actuator structure is provided via a mechanism in the preferred embodiment that uses an eccentric hub associated with a drive shaft to provide a wedging action to lock the mechanism against the cylindrical surface of a housing. Further, the object of simplification of parts is provided in the preferred embodiment to lock with the use of only one locking member in each locking or wedging space, using two thirds or fewer number of parts as used in other clutch mechanisms. Less free play is also accomplished by the described combination. Additionally, such a device must be available to be used as either a right handed device or a left handed device in association with the seats of a vehicle, depending upon which seat in a vehicle has the device attached, so that no additional parts are necessary. Furthermore, a rotation limiter can be built into the device to limit its rotation to a predefined amount of degrees of rotation, wherein the entire functionality of the product actuated by the device can be accomplished in that limited amount of rotation.

SUMMARY OF THE INVENTION

The present invention is a substantial improvement over the current actuators for lumbar support systems because it provides an actuator that is light weight, has fewer components, is durable, is more compact, has less free play, can be either right or left handed, and is less costly. Thus, the present inventions as defined by the various claims is intended to overcome the disadvantages of the current actuator art and thereby provide a relatively light weight, compact in size, less free play, universal (left or right handed), cost efficient actuator for a mechanical lumbar support system.

The present inventions as defined by the various claims is intended to provide an actuator for a lumbar support system which has one or more of the following features: has reduced overall size and weight, has fewer components, has reduced duplicative components, can lock in one predetermined rotary direction, has less free play, and is cost efficient.

The present inventions as defined by the various claims may also intend to provide an actuator for a lumbar support system which includes a releasable clutch that slips with rotation in either direction, resulting in two different outputs based on the direction of rotation either a clockwise or counter-clockwise rotation of the actuator, but that locks torque load when no manual rotation of the actuator occurs, or when the movement stops.

A further intent of at least one or more of the claimed inventions is to provide an actuator with one or more of the above features which also has limited movement to provide the entire functionality of the product to be actuated in a predefined amount of movement of the actuator. In one form, with preferably a lever actuator, this movement is less than 180 degrees of movement of the actuator. A knob actuator can be used for movement of the actuator in any amount, even multiples of 360 degrees representing multiple turns of the knob.

In one form, the present invention provides the art with an actuator for a lumbar support system including a flexible support element operated by a cable, such as a Bowden-cable arrangement, via the actuator. The actuator includes a locking action in one rotary direction and movement of the cable via rotation of the actuator mechanism in both rotary directions such that the actuator adjusts the flexible support element via the cable to flex the element either more or less, as desired, yet locks the actuator and the element in place once the actuator is no longer manipulated. This actuation can be set for either a left handed or a right handed actuation, with either clockwise or counterclockwise rotation to provide the correct actuation.

It is believed that all of, any one of, or even part of the above features can be defined into various claims for patentable invention. Additional benefits, along with other advantages and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention:

FIG. 6a is an elevated perspective view of another part of the assembly of FIG. 3, with FIG. 6b as an elevated top view and FIG. 6c as a vertical sectional view along the line "FIG. 6c—6c" of FIG. 6b;

FIG. 7a is an elevated perspective view of another part of the assembly of FIG. 3, with FIG. 7b as an elevated bottom view, and FIG. 7c an elevated top view of the same part; FIG. 7d is a sectional view of FIG. 7c along the line "7d—7d" and FIG. 7e is a sectional view of FIG. 7b along the line "7e—7e";

DETAILED DESCRIPTION OF THE PREFERRED EMBODIMENT

Figure 1:
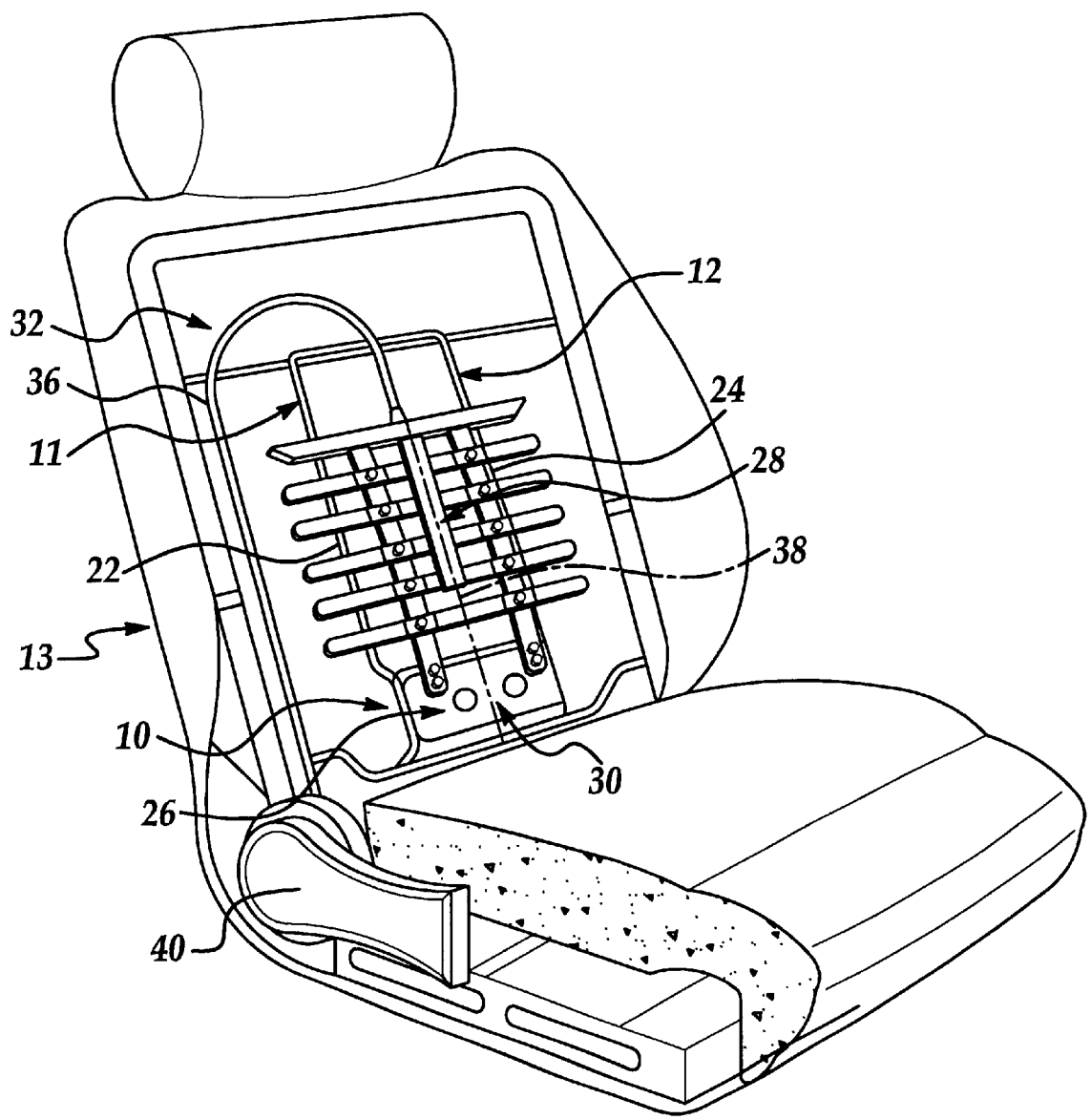
FIG. 1 is an environmental view of an actuator in a lumbar support system constructed in accordance with the teachings of a preferred embodiment of the present invention and shown operatively installed in a seat.

Referring now to the drawings, there is depicted a lumbar support system embodying the concepts of the present invention. The lumbar support system of the present invention is generally identified in the drawings with reference numeral 10 and is shown through the drawings adapted to cooperate with a specific seat via guide wires 11 and 12. However, the teachings of the present invention are more broadly applicable to seats for a large range of applications.

The seat portion 13 illustrated is otherwise of conventional construction. A flexible support element 26 is operably connected to parallel portions 22 and 24 of the guide wires 11 and 12 so as to be capable of moving up and down at the top 27 of the element 26. The support element 26 may be any generally flexible support element, made of any general material including plastic, metal or any combination thereof, in a plurality of parts or in one piece having an upper portion 28 for supporting the lumbar vertebrae and a lower portion 30 for supporting the pelvis and the pelvic vertebrae.

Figure 2:
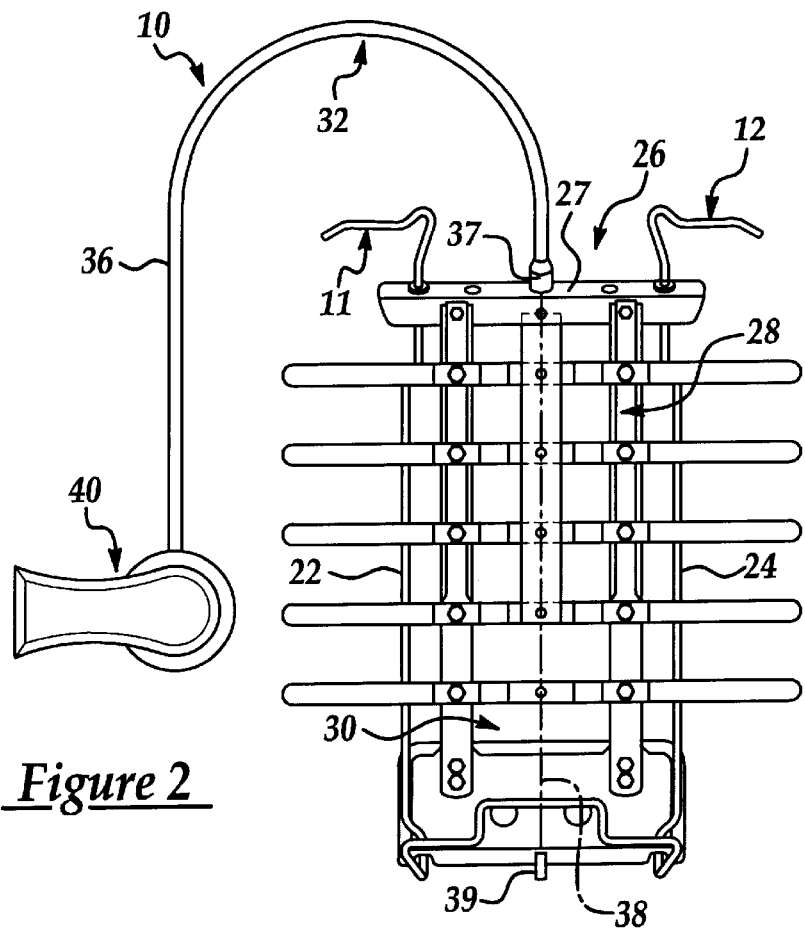
FIG. 2 is an exploded perspective view of the apparatus of FIG. 1 shown schematically removed from the seat for purposes of illustration.
Figure 2A:
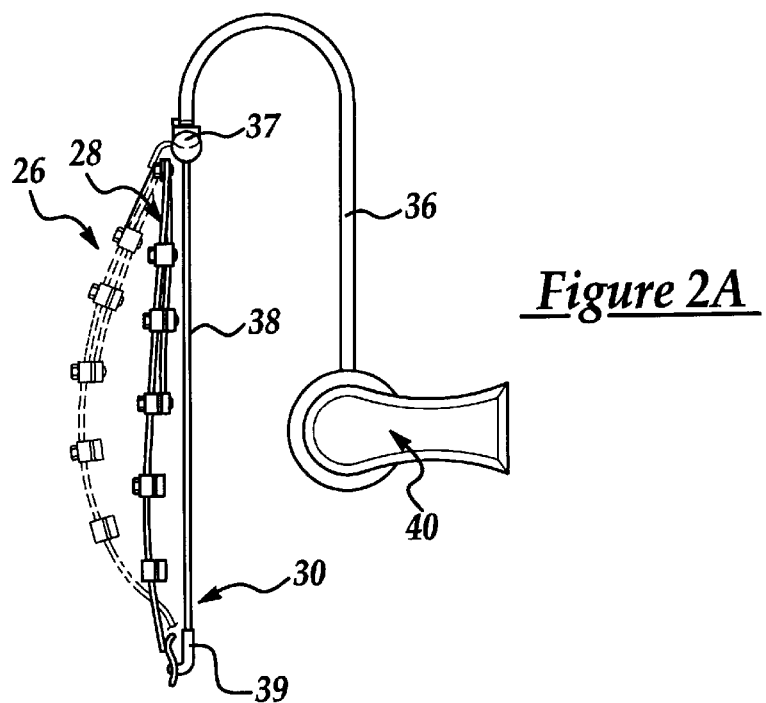

The lumbar support system 10 is capable of adjusting for arching, that is, in the in-out direction, as shown in FIG. 2A. These adjustments are accomplished through the use of a Bowden cable arrangement 32. The Bowden cable arrangement 32 includes a sheath 36 and a cable 38 within the sheath 36. The sheath 36 of the Bowden cable arrangement 32 is fixed at one end to the support element 26 and at the other end to an actuator assembly 40. The cable 38 of the Bowden cable arrangement 32 extends from the sheath 36 and is fixed at one end to the support element 26 via any attachment device known to the art (shown here as a hook 39) and at the other end to an actuator assembly 40. The sheath 36 is fixed to the support element 26 in one of a variety of ways. In FIG. 2, an attachment is made via a guide 37.

As will become apparent below, the lumbar support system 10 is operative to drive in-out directional adjustments (arching), as shown in FIG. 2A, through the use of the actuator assembly 40. As known in the art, the flexible support element 26 may be fixed from movement at the top (where the bottom moves toward the top), the bottom (where the top moves toward the bottom), or neither (where the two extremes of the element 26 move toward one another.

Figure 3:
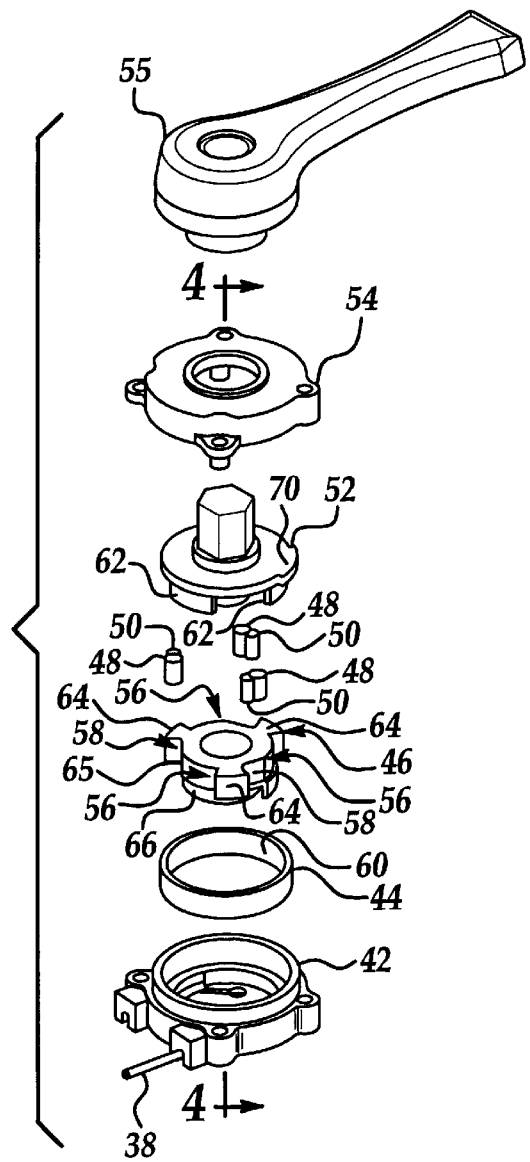
FIG. 3 is an exploded perspective view of the actuator of FIGS. 1 and 2 removed from the environment shown in FIGS. 1 and 2.
Figure 4:
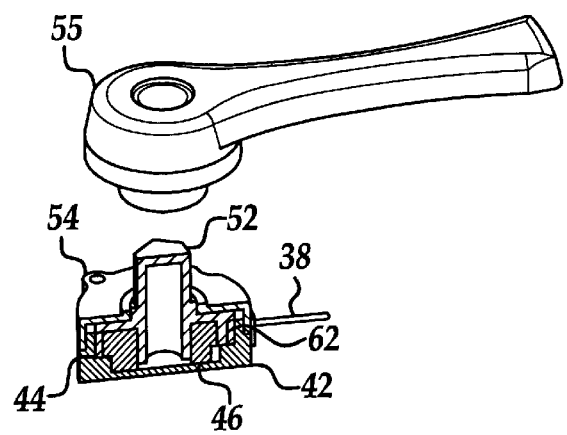
FIG. 4 is an enlarged cross-sectional view of the assembly of FIG. 3 along the line 4—4 of FIG. 3.
Figure 5A:
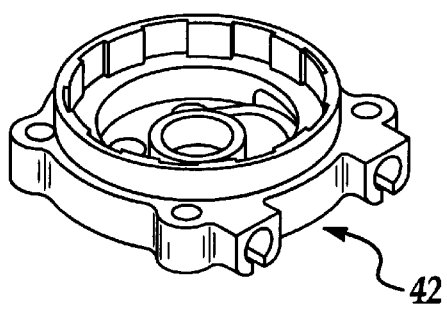
FIGS. 5a and 5g are perspective views of the housing portion of the actuator.
Figure 5B:
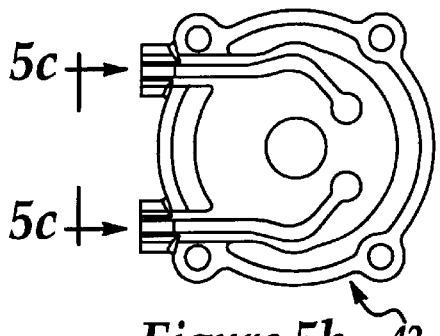
FIGS. 5b is a top elevated view and FIG. 5d is a bottom elevated view of the housing portion of the actuator.
Figure 5C:
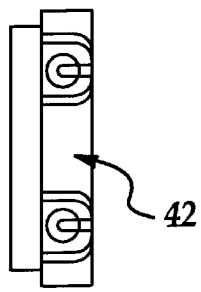
FIG. 5c is a side elevated view of the housing portion of the actuator looking in the direction "5c—5c" of FIG. 5b.
Figure 5D:
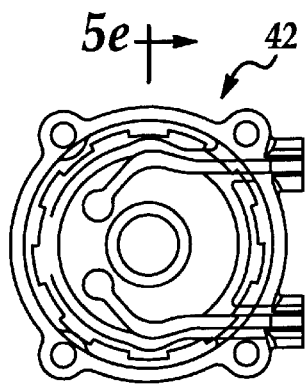
Figure 5E:
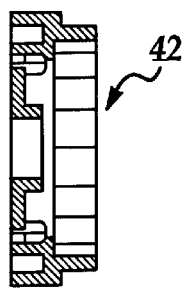
FIG. 5e is a vertical sectional view as shown by the line "5e—5e" of FIG. 5d.
Figure 5F:
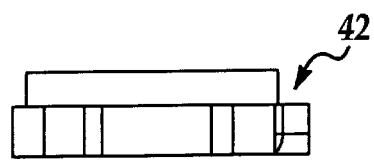
FIG. 5f is a side elevated view looking in the direction "5f—5f" of FIG. 5d.
Figure 5G:
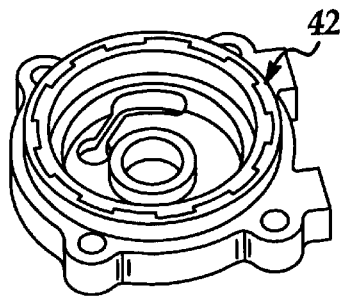
Figure 8A:
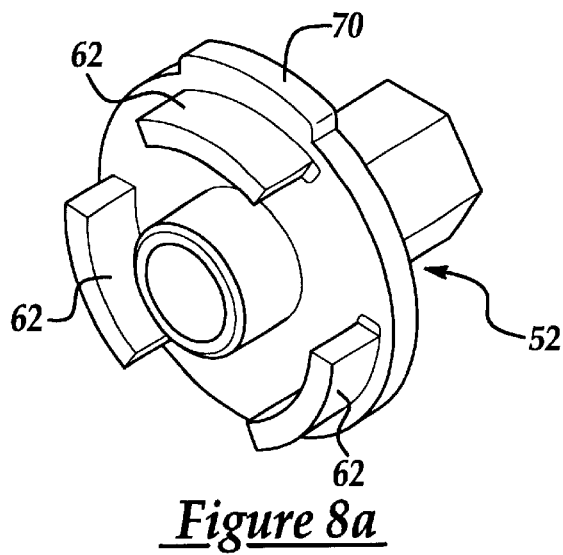
FIG. 8a is an elevated perspective view of another part of the assembly of FIG. 3 with FIG. 8d as an elevated bottom view, and FIG. 8b an elevated top view of the same part.
Figure 8B:
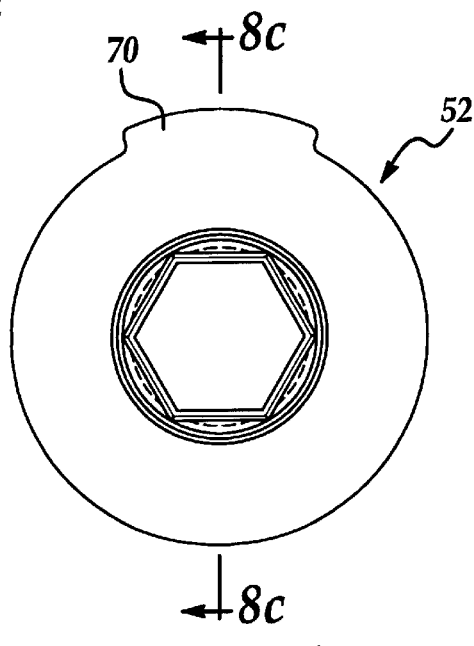
FIG. 8c is a sectional view of FIG. 8b along the line "8c—8c"
Figure 8C:
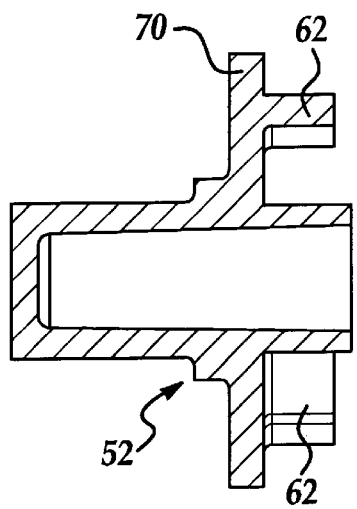
Figure 8D:
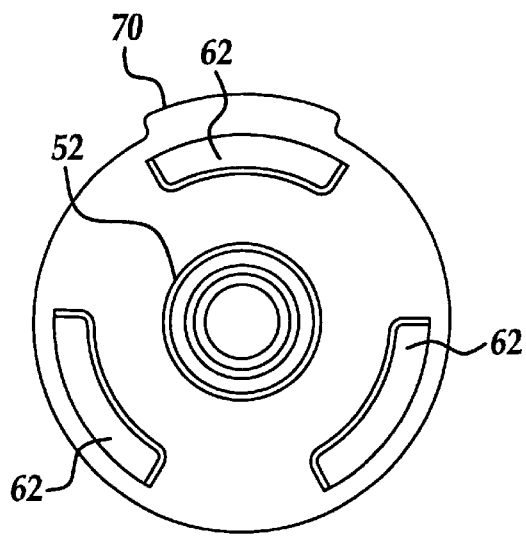
Figure 9A:
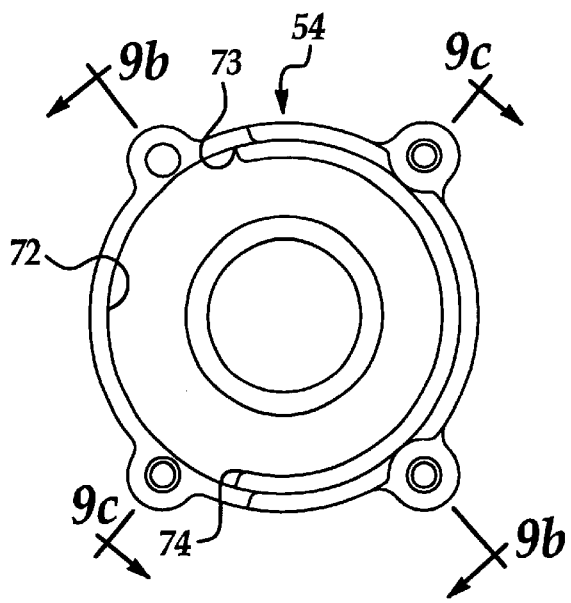
FIG. 9a is an elevated top view of another part of the assembly of FIG. 3, with FIG. 9d as an elevated bottom view of the same part.
Figure 9B:
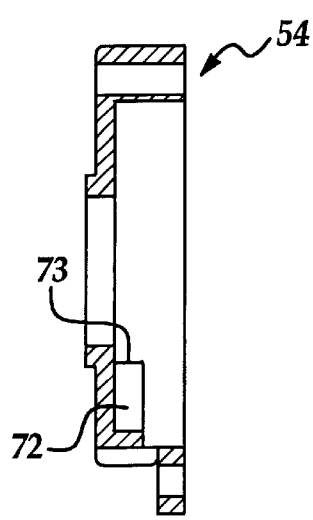
FIG. 9b is a sectional view of FIG. 9a along the line "9b—9b" and FIG. 9c is a sectional view of FIG. 9a along the line "9c—9c"
Figure 9C:
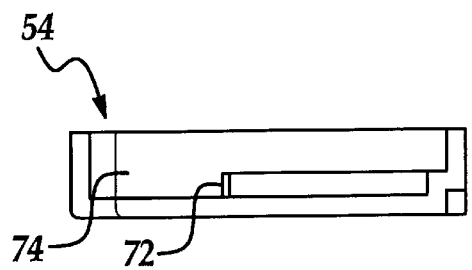
Figure 9D:
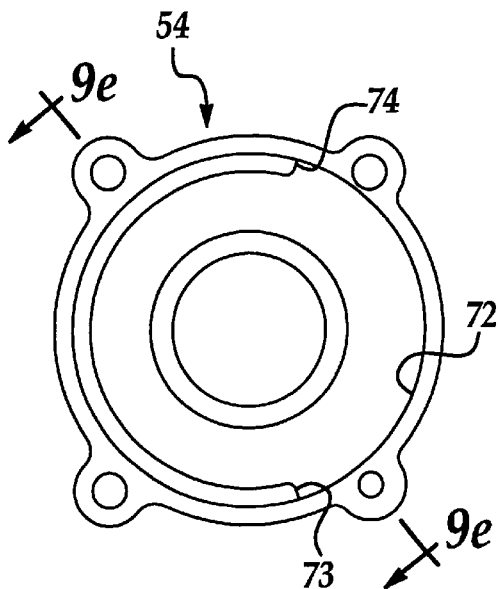
FIG. 9e is a sectional view of FIG. 9d along the line "9e—9e"
Figure 9E:
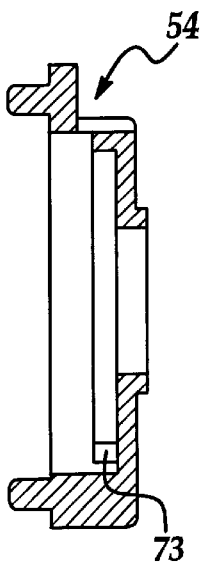

With continued reference to FIGS. 3 and 4, the actuator assembly 40 for the lumbar support system 10 of the preferred embodiment of the present invention will now be further discussed. As shown most clearly in the exploded perspective view of FIG. 3, the actuator assembly 40 of the lumbar support system 10 includes a housing 42, a reinforcing ring 44, an eccentric hub 46, three rollers 48, three rubber springs 50, a drive shaft 52, a cap 54, and a lever actuator handle 55 to form a directional one-way locking clutch. The housing 42 includes a passageway for a cable 38 to pass from outside 43 of the housing 42 to the interior 45 of the housing 42. The cable sheath 36 may be attached directly to the housing 42 at this point.

When the drive shaft 52 is set in the cap 54, a tab 70 is set into a guideway 72 in the cap 54 having a stop 73 and a stop 74, one at each end of the guideway 72 to limit the movement of the tab 70. When the parts are assembled, the tab 70 is fixed relative to the shaft 52, and its movement, limited by the configuration of the guideway 72, limits the movement of the shaft 52 to act as a limitation on the amount of rotation permitted by the actuator 40. In the disclosed embodiment with the lever actuator 55, the entire amount of rotation is between 120 degrees and 135 degrees of maximum movement. The flexible support 26 of the lumbar unit 10 will move from one of its two most extreme positions to the other of its most extreme positions in the entire limited amount of rotation selected.

FIGS. 7a and 7b show the two layouts of the eccentric hub 46 that can be used to determine the right-handed or left-handed location of the actuator 40. All other parts of the actuator 40 remain the same. The hub 46 is configured either as shown in FIG. 7b for locking clockwise tonque load or as shown in FIG. 7a for locking counterclockwise torque load. The position of the cable connection aperture 76 is positioned differently for locking counterclockwise torque load (FIG. 7a) than for locking clockwise torque load (FIG. 7b), although the positions are a mirror image of one another. The connection of the cable 38 to the hub 46 is shown in FIG. 7e, and merely includes a design where the end of the cable 38 is thickened or has some attachment which acts as a hook to secure the cable 38 into the aperture 76 to permit the cable 38 to be pulled via rotation of the hub 46 when the cable 38 is fixed at its other end to the support element 28. FIGS. 7c and 7d show other views of the hub 46, including various designations illustrating the spacing of the various elements of the hub 46 in degrees. Each stop section 64 has a first surface 78 which can contact one of the fingers 62 and a second surface 80 which can contact one of the springs 50, as well as a third surface 82 to stabilize the hub 46 in the actuator 40 when assembled.

The reinforcing ring 44 seats coaxially within the housing 42 as shown in FIGS. 3 and 4. The eccentric hub 46 then is placed coaxially into the housing 42 and reinforcing ring 44. The drive shaft 52 fits over the eccentric hub 46.

Figure 10:
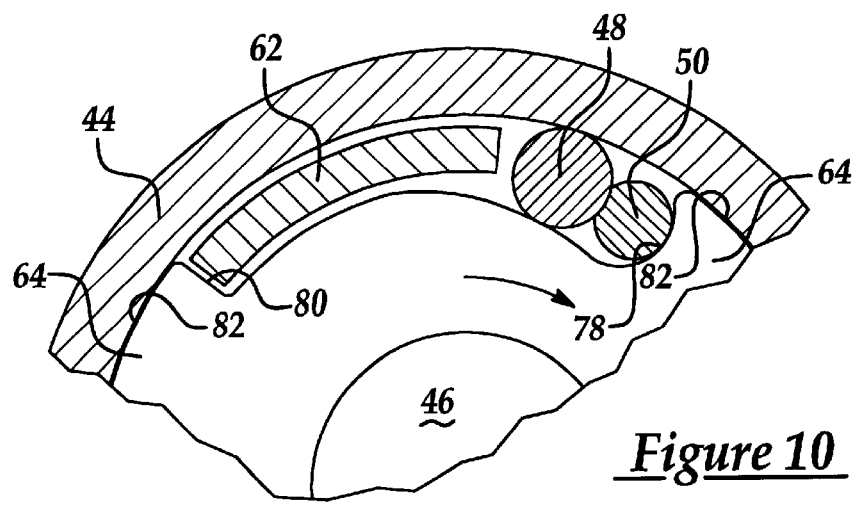
FIG. 10 is a schematic view of the locking mechanism of the actuator of FIG. 3, with FIG. 11 as a schematic view of the pulling function of the actuator of FIG. 3, and FIG. 12 as a schematic view of the releasing function of the actuator of FIG. 3.
Figure 11:
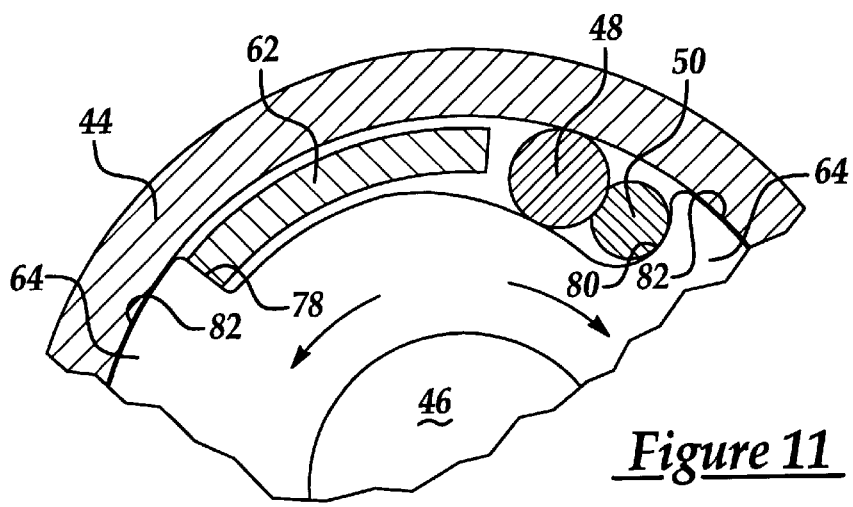
Figure 12:
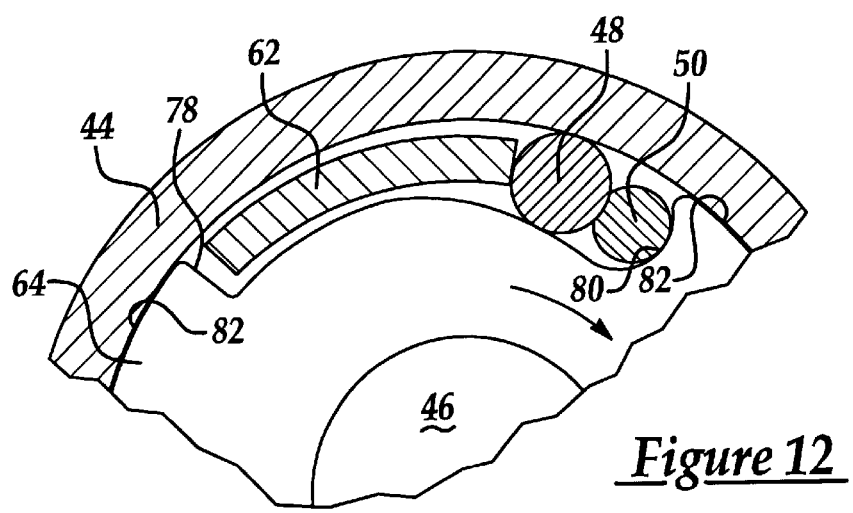

In the illustrated embodiment, there are three active wedge spaces or zones 54, although more or fewer wedge spaces or zones could be used for a different environment, a different design on lumbar support assembly, or even in the same environment as shown, but seeking a different result. Each space or zone 54 (see FIGS. 10, 11 and 12) is configured by a periphery comprised of the outer eccentric surface 56 of the pockets 58 of the hub 46, and the inner surfaces 60 of the ring 44. As shown in FIG. 10, a roller 48 and a spring 50, usually made of rubber, are disposed in each zone 54, with the spring 50 disposed in contact with the roller 48 on the side of the roller 48 which is designed to lock against the stop section 64 of the pocket 58 in the first direction of movement that is intended not to pull the cable. When the drive shaft 52 is rotated via the handle 56 in the opposite direction (as the second direction of movement that is intended to pull the cable 38), the cable 38 is pulled (or tensioned), and the element 26 is flexed. The locked actuator is released by means of fingers 62 disposed on the drive shaft 52, which push against the roller 48 to unlock the roller 48 from the apex 65 of the eccentric hub 46 when rotated in this second rotational or rotary direction of movement. Note that the first direction of movement can be clockwise or counterclockwise, as desired, and the second direction of movement would be rotary or rotational movement in the opposite direction.

The amount of travel of the sheathed cable 38 of the Bowden cable arrangement 34, and thereby the amount of in-out directional adjustment provided, can also be controlled by the diameter of the rotating spool element 66 of the eccentric hub 46.

Figure 13:
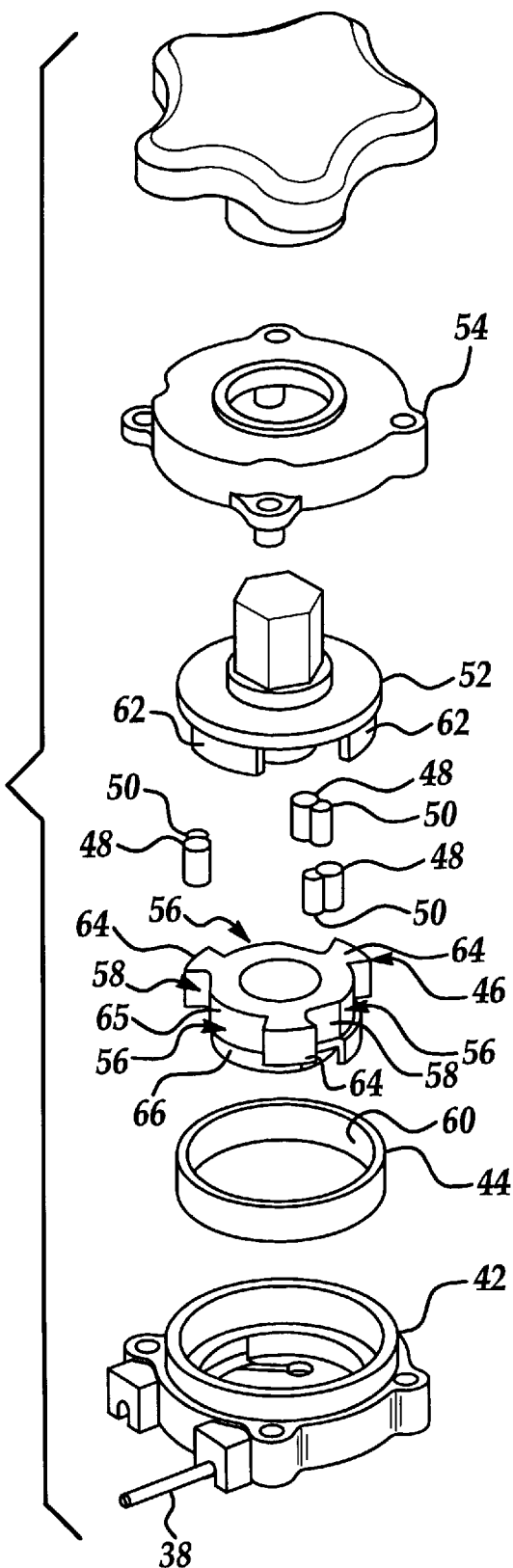
FIG. 13 is an exploded perspective view similar to FIG. 3 where a knob is substituted for the lever of the actuator.

The actuator assembly is illustrated with a lever actuator handle 55 which can be used effectively with minimal degree of rotation associated will full functionality of the device used with the actuator assembly 40, in this case a lumbar support system 10. An alternative is shown in FIG. 13 where a knob 53 can be substituted for the handle 55. The knob 53 is particularly effective when full functionality of an associated product actuated by the cable is developed with rotation of greater than 180 degrees or even multiple rotations in amounts greater than multiples of 360 degrees. In some instances this may include lumbar support systems. Thus, no tab 70 or stop mechanism 72, 73, 74 would be included with use of the knob 53.

While the above detailed description describes the preferred embodiment of the present invention, it should be understood that the present invention is susceptible to modification, variation and alteration without deviating from the scope and fair meaning of the subjoined claims.

what is claimed is:

1. A lumbar support system comprising:
   a flexible support element having a first directional adjustment and a second directional adjustment;
   a control device for said support element selectively positionable in a first and second direction, including a Bowden cable mechanism; and
   an actuator for selectively adjusting said flexible support element via said control device, said actuator including:
      a one-way clutch operably coupled to said control device to move in a first rotary direction;
      said Bowden cable mechanism having a drive end operably coupled to said one-way clutch and a driven end operably coupled to said flexible support element such that said control device adjusts said first directional adjustment of said flexible support element when driven in said first direction; and
      at least one locking element operably coupled to said control device to lock an actuator torque load when moved in the opposite rotary direction to said first rotary direction.

2. The lumbar support system according to claim 1 wherein said one-way clutch slips when driven in a first rotary direction and locks torque load via said at least one locking element when driven in the opposite rotary direction.

3. The lumbar support system according to claim 1 wherein said first rotary direction comprises a clockwise rotary direction.

4. The lumbar support system according to claim 1 further comprising:
   a housing, having an interior surface;
   a drive shaft;
   an eccentric hub operably connected to said drive shaft, having an exterior surface;
   a mechanism configured in part on said interior surface of said housing and configured in part on said exterior surface of said hub to create a wedge space between the two surfaces; and
   locking elements disposed within said wedge spaces formed by said surfaces, whereby rotation of said shaft drives said actuator to adjust said flexible support element in a first direction and said locking elements lock said actuator in the opposite rotary direction.

5. The lumbar support system according to claim 1 wherein said actuator is manually operated.

6. The lumbar support system according to claim 1 wherein said flexible support element includes an upper portion for supporting a lumbar vertebrae region and a lower portion for supporting a pelvic vertebrae region.

7. The lumbar support system of claim 1, wherein the tension of the cable locks the locking element.

8. A lumbar support system comprising:
   a flexible support element having a first directional adjustment and a second directional adjustment;
   an actuator selectively moveable in a clockwise direction and a counter-clockwise direction for selectively adjusting said flexible support element, including:
   a drive shaft;
   a one-way clutch operably coupled to said drive shaft;
   a Bowden cable arrangement having a drive end operably coupled to said one-way clutch and a driven end operably coupled to said flexible support element such that said drive shaft adjusts said first directional adjustment of said flexible support element when moved in one of a clockwise or counterclockwise direction; and
   at least one locking element associated with said drive shaft such that said actuator is locked in said other of said clockwise or counterclockwise direction.

9. The lumber support system according to claim 8 wherein said one-way clutch locks when driven in a first rotational direction and slips when driven in a second rotational direction.

10. The lumbar support system according to claim 8 further comprising a connecting mechanism between said Bowden cable arrangement and said at least one locking element wherein tension from said support element on said Bowden cable arrangement locks said at least one locking element with said drive shaft to lock said actuator.

11. The lumbar support system according to claim 8 wherein said flexible support element is made from plastic.

12. The lumbar support system according to claim 8 wherein said flexible support element includes an upper portion for supporting a lumbar vertebrae region and a lower portion for supporting a pelvic vertebrae region.

13. A seat assembly having an adjustable seat back comprising:

a seat back assembly including a frame having a first end and a second end;

a flexible support element operably connected to said first end of said frame, said flexible support element having a first directional adjustment and a second directional adjustment;

a control device selectively positionable in a first and second direction; and an actuator assembly for selectively adjusting said flexible support element via said control device, said actuator assembly including:

a one-way clutch operably coupled to said control device;

said control device including a Bowden cable arrangement having a drive end operably coupled to said one-way clutch and a driven end operably coupled to said flexible support element such that said control device adjusts said first directional adjustment of said flexible support element when the actuator assembly is driven in a first rotational direction;

wedge elements for locking a clutch torque load in the opposite rotary direction to said first rotational direction; and releasing elements associated with both said clutch and said wedge elements to allow movement to occur in said first rotational direction.

14. The seat assembly according to claim 13 wherein said one-way clutch locks via said wedge elements when driven in said first rotational direction and slips when driven in a second rotational direction.

15. The seat assembly according to claim 14 wherein said first rotational direction comprises a clockwise rotational direction and said second rotational direction comprises a counter-clockwise rotational direction.

16. The seat assembly according to claim 13 wherein said actuator assembly is manually operated.

17. The seat assembly according to claim 13 wherein the tension of the cable locks said wedge elements.

* * * * *